United States Patent
Bru

Patent Number: 6,091,768
Date of Patent: *Jul. 18, 2000

[54] DEVICE FOR DECODING SIGNALS OF THE MPEG2 TYPE

[76] Inventor: Bernard Bru, 11 rue Alfred de Vigny, 94450 Limeil-Brevannes, France

[*] Notice: This patent issued on a continued prosecution application filed under 37 CFR 1.53(d), and is subject to the twenty year patent term provisions of 35 U.S.C. 154(a)(2).

[21] Appl. No.: 08/795,495

[22] Filed: Feb. 5, 1997

[30] Foreign Application Priority Data

Feb. 21, 1996 [FR] France ................................ 96 02149

[51] Int. Cl.$^7$ ............................... H04B 1/66; H04N 7/12
[52] U.S. Cl. ........................... 375/240; 348/419; 348/423; 365/230.03
[58] Field of Search ................................ 348/390, 714, 348/715, 423, 405, 419, 388, 523, 415; 345/519; 365/230.03, 220; 375/240; H04N 7/24; H04B 1/66

[56] References Cited

U.S. PATENT DOCUMENTS

| | | |
|---|---|---|
| 5,036,493 | 7/1991 | Nielsen ............................. 365/230.03 |
| 5,502,571 | 3/1996 | Decotignie et al. .................... 348/388 |
| 5,574,876 | 11/1996 | Uchiyama et al. .................... 395/405 |
| 5,623,308 | 4/1997 | Civanlar et al. ...................... 348/392 |
| 5,629,736 | 5/1997 | Haskell et al. ........................ 348/390 |
| 5,680,483 | 10/1997 | Tranchard ............................. 348/405 |
| 5,686,965 | 11/1997 | Auld ...................................... 348/423 |
| 5,742,732 | 4/1998 | Kubo et al. ........................... 348/423 |
| 5,784,076 | 7/1998 | Crump et al. ......................... 345/519 |
| 6,008,849 | 12/1999 | Frecken ................................. 348/415 |

FOREIGN PATENT DOCUMENTS

| | | |
|---|---|---|
| 0710029A2 | 5/1996 | European Pat. Off. ......... H04N 7/24 |
| 2743248 | 7/1997 | France . |
| WO9532578 | 11/1995 | WIPO . |

OTHER PUBLICATIONS

T. Fautier, "VLSI Implementation of MPED Decoders", Chapter 3.22, pp. 164–172.

ISO/IEC JTC 1/SC 29 published on Apr. 27 1995 by the International Standardization Organization ISO, "Revised text for ITU–T Recommendation H.222.0/ISO/IEC 13818–1, Information Technology—Generic coding of moving pictures and associated audio information: Systems".

*Primary Examiner*—Chris S. Kelley
*Assistant Examiner*—Gims Philippe

[57] ABSTRACT

Device for decoding encoded digital signals corresponding to n different types of data, for example audio, video or graphic data. Such decoder includes, upstream of the decoder itself, an input interface which includes a storage sub-assembly composed of n parallel registers for receiving said data. The input interface also includes, between such registers and an external DRAM-type memory of the decoder, a series arrangement of a first buffer memory (43) for storing the contents of a register as soon as one of them is full, and a second buffer memory (44) constituted by n parallel blocks (45a, 45b, . . . ) for storing, per type of data, the contents of the first buffer memory. At the output of such storage blocks, the corresponding requests for access are carried out by a synchronizing clock (47) via an arbiter so as to transmit the contents of the blocks to the external DRAM memory.

2 Claims, 3 Drawing Sheets

DEVICE FOR DECODING SIGNALS OF THE MPEG2 TYPE

BACKGROUND OF THE INVENTION

1. Field of the Invention

The invention relates to a device for decoding encoded digital signals corresponding to n types of data of a distinct nature and multiplexed in conformity with the standard referred to as MPEG2 system, comprising particularly an input stage for receiving and storing said data and a communication bus with an external memory.

The field in which this invention is used is constituted by "multimedia" applications in which the decoder can receive data relating to different contexts (video, audio, graphic, etc.) but which are received by the same transmission unit. First of all, these data have been multiplexed in accordance with the MPEG2 system standard (described in the document ISO/IEC JTC 1/SC 29 published on Apr. 27, 1995 by the International Standardization Organization ISO and entitled "Revised text for ITU-T Recommendation H.222.0/ISO/IEC 13818-1, Information Technology—Generic coding of moving pictures and associated audio information: Systems"). The invention particularly relates to the way in which these multiplexed data are received and in which they are demultiplexed before being transmitted to a storage unit for subsequent processing.

2. Description of the Related Art

The textbook "VLSI Implementation of MPEG decoders", T. Fautier, ISCAS '94, London, May 1994, chapter 3.22, pp. 164–172, describes an MPEG decoding configuration intended to receive compressed video data and comprising, at the input, a memory write stage consisting of two flipflop storage units. While one of these units receives the compressed stream of data and is being filled, the other re-transmits the data previously received and, once it is empty, receives in its turn the stream of input data, during which the first unit re-transmits, and so forth. When such a decoder is capable of receiving data relating to different contexts, it should comprise as many pairs of flipflop storage units as there are different contexts (or different types of data to be controlled).

SUMMARY OF THE INVENTION

It is an object of the invention to provide a decoding device of the MPEG type comprising a data receiver stage having a simple structure and notably allowing a gain in surface area and in number of memories and thus a considerable reduction of the production costs.

To this end, the invention relates to a device as defined in the opening paragraph and comprises, in series, the following elements:

(1) a storage sub-assembly comprising n registers corresponding to n types of data and receiving, in parallel, the stream of said encoded and multiplexed digital signals;

(2) a first buffer memory for temporarily storing the contents of one of the n registers as soon as said register is full and for storing information relating to the type of data contained in said register;

(3) a second buffer memory comprising n parallel-arranged memorizing blocks for storing, per type of data, the contents of said first buffer memory; a synchronizing clock being provided for carrying out requests for access to the external memory of the decoding device.

With the structure thus proposed, the number of contexts, i.e. of types of data, may vary with time in a manner which is much more flexible than in the previous case. As a matter of fact, there is a number of two storage units, regardless of the number of data types. In addition, the control logic of the device is simple: there is no queue control, the first filled block immediately leads to a transmission. Finally, the reduction of the memory size and the decreased complexity of the device allows a considerable reduction of manufacturing costs.

These and other aspects of the invention will be apparent from and elucidated with reference to the embodiments described hereinafter.

DETAILED DESCRIPTION OF THE PREFERRED EMBODIMENTS

Figure 1:
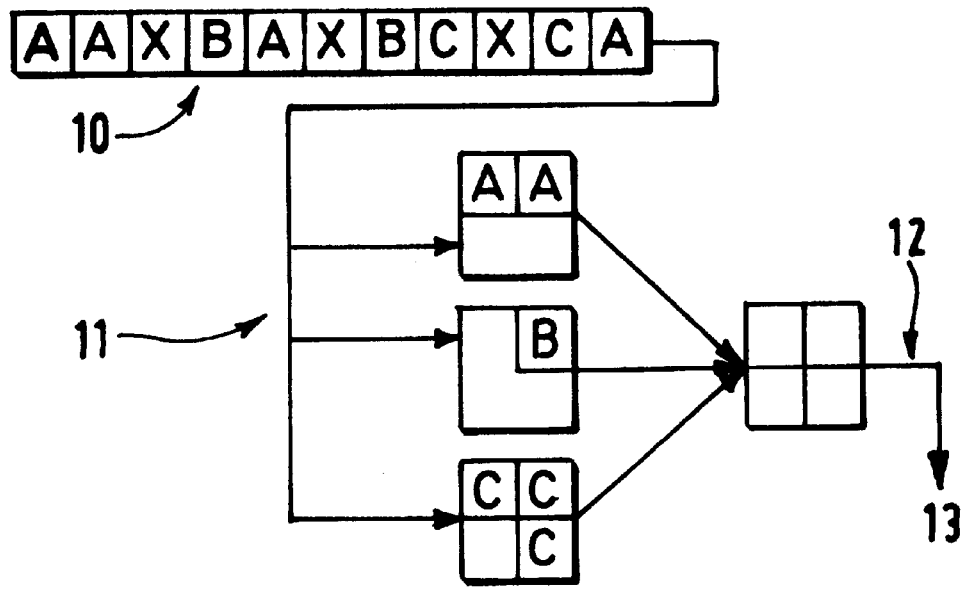
FIG. 1 shows the general principle of receiving and storing a stream of signals of the MPEG2 system type.

FIG. 1 illustrates the principle of operation of a decoder as described in the afore-mentioned textbook, in the case where it receives heterogeneous data having distinct rates. A channel 10 ensures the transmission of the data of, for example type A or B or C (the zones X correspond to periods of absence of transmission of data or data which are not used in the application described in this case). A demultiplexer 11 ensures the constitution of packets of data of the same type (it is actually more economical to transmit the data in packets of an identical type but with a size which may be externally imposed by the transmission system), with which each packet of data of the same type can be transmitted (operation 12) to a storage unit 13 as soon as a packet which is being created has the required size.

Figure 2:
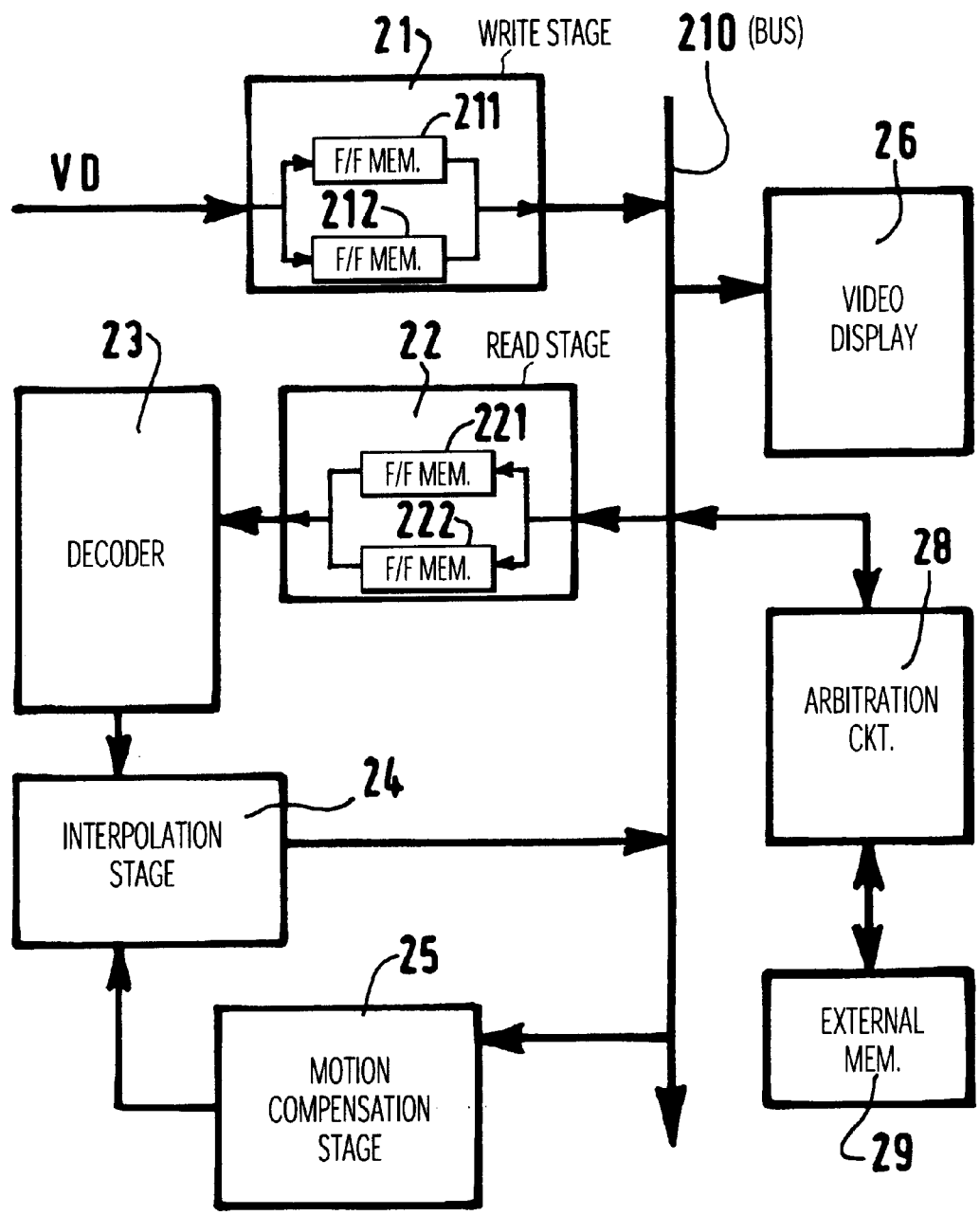
FIG. 2 shows the principle of operation of an MPEG video decoder and the general construction of such a decoder.

FIG. 2 shows in detail the construction of the video MPEG decoder described in said textbook. To receive the stream of video data VD previously compressed and transmitted, this decoder comprises a memory write stage 21 comprising two memories 211 and 212 arranged in a flipflop configuration as mentioned above. The stage 21 sends the retransmitted data to a communication bus 210 which is coupled to an external memory 29 (the DRAM memory mentioned in the document) via an arbitration circuit 28 which manages all the requests for access to this external memory. The data thus stored are then transferred to a decoding stage 23 via a read stage 22 also comprising two flipflop memories 221 and 222. The output signal of the decoding stage 23 is applied to a first input of an interpolation stage 24 which also receives the output signal from a motion compensation stage 25. The decoded data can then be transmitted to a video display stage 26.

Figure 3:
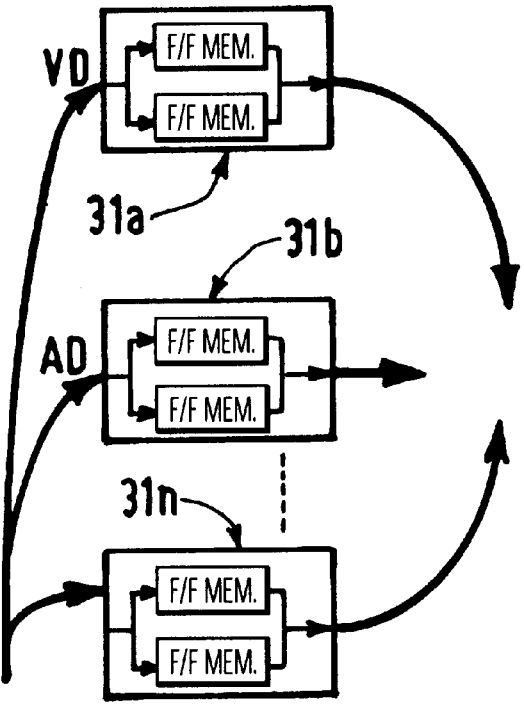
FIG. 3 shows the possible receiver structure of the input stage of a decoder as shown in FIG. 2 to enable it to receive different types of data.
Figure 4:
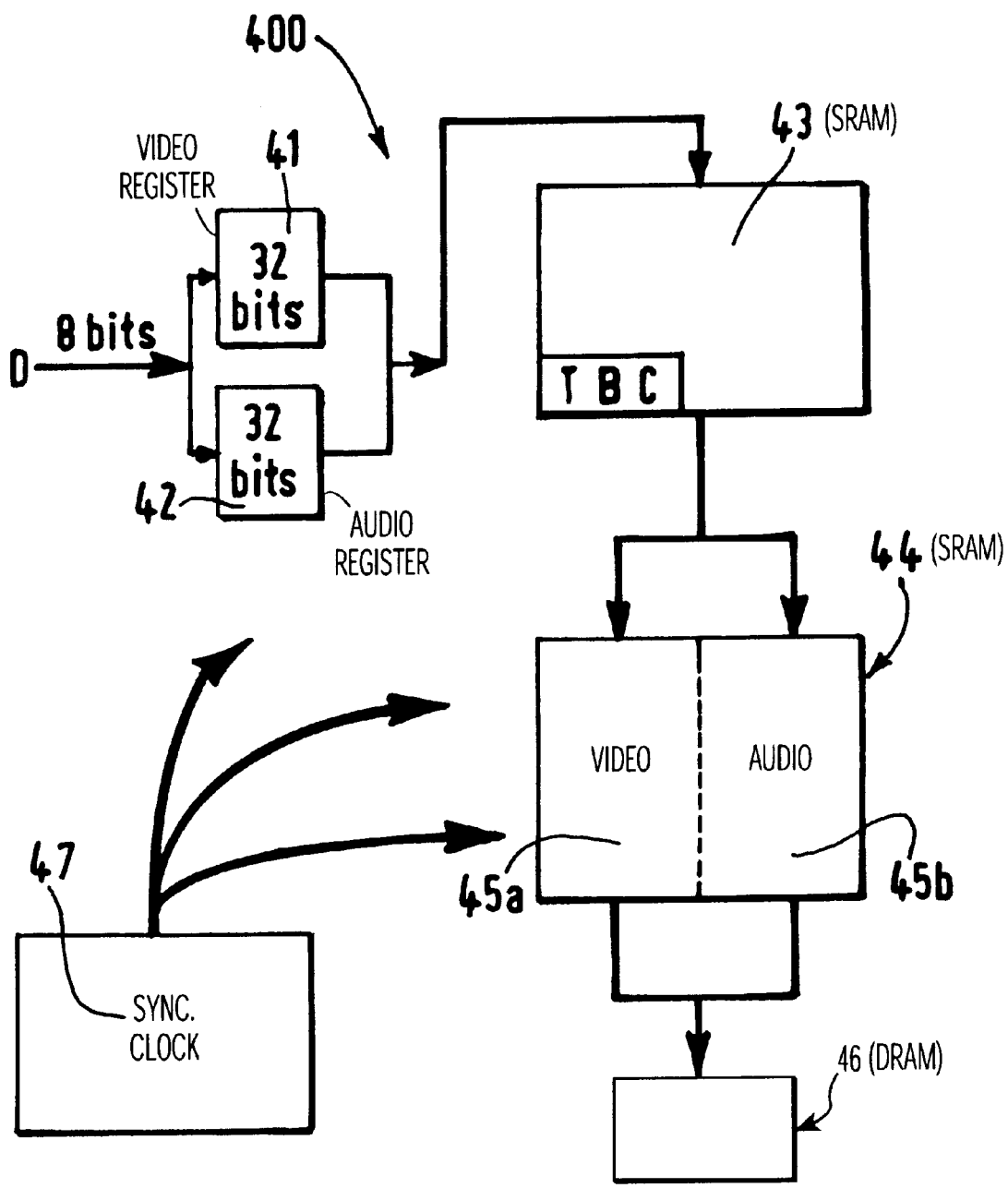
FIG. 4 shows an embodiment of the input stage of the decoding device according to the invention.

In this construction, in which the different stages of the decoder of the cited document are realized, the invention described hereinafter is used in the input interface constituting the memory write stage 21. FIG. 3 shows the possible structure, in the absence of the invention, of the input interface of the decoding device to enable it to receive different types of data, namely as many write stages 31a, 31b, ..., 31n as there are types of data, which stages are identical to the stage 21 in FIG. 2 (in the present case: video data VD, audio data AD, etc ...). In contrast, FIG. 4 shows an embodiment of the input stage, denoted by the reference numeral 400, in accordance with the present invention in the case where only two different types of data are received (particularly video and audio data, which currently constitute a frequent case: see, for example, Patent Application WO 95/32578). The invention is none the less suitable for receiving an arbitrary number of different types of data.

For receiving the compressed and multiplexed input data D, which are present at an 8-bit input bus in this case, the input stage 400 particularly comprises a video register 41 and an audio register 42 arranged in parallel (here of 32-bit registers). The common output signal of these two registers is applied to a first memory 43 of, for example the SRAM type. The first memory 43 is followed by a second memory 44, also of the SRAM type, comprising a video memory block 45a and an audio memory block 45b. The output of this memory 44 is connected to a third memory 46 which is the external memory of the DRAM type, which is present in an MPEG type decoder.

This input stage 400 operates as follows. The input of the decoding device receives data D, for example of the video and audio type (recognizing and detecting the type of data received does not form part of the invention and is therefore not described). These data are first stored in the corresponding register 41 or 42 (video or audio). As soon as this register is full, its contents are transferred to the first SRAM memory 43 (with an 8-bit bus, the contents of the full register 42, for example, are entirely written into memory 43 every four cycles if an 8-bit data word is received in every clock cycle). The data of the register concerned are written into the 32 least-significant bit of each word in the memory 43, the two most-significant bit positions being reserved for constituting a two-bit code TBC used for identifying the type of data considered.

The memory 43 is used as a buffer for the second SRAM memory 44 when the latter is not usable because of a request for access to the third DRAM memory 46. In contrast, when this second SRAM memory 44 is usable, it receives the data from the first SRAM memory 43 and stores them in accordance with their type (known by the value of the two bits of the TBC code) in one of the two blocks 45a or 45b. As soon as a block (video or audio) is full, a synchronizing clock 47 requests access to this third memory 46 via an arbitration circuit (not shown).

The advantages of the proposed solution may be summarized as follows:

(1) the device requires only two storage units, irrespective of the number of types of data to be managed and only one associated control block (in contrast, n such blocks are necessary when the conventional arrangement of n flip-flop storage units are used), which reduces the risks of errors;

(2) as compared with an MPEG decoder as hitherto realized, a gain in surface area and reduction in the number of SRAMs used is obtained, as follows:
   (a) in the case of flipflop SRAMs: the amount of storage required is 2×n×m, using 2n SRAM memories, in which n is the number of types of data and m is the number of SRAM storage rows;
   (b) in the case of two series-arranged SRAM memories: the amount of storage required is (n×m)+p, in which p is the number of rows of the first SRAM memory 43, or more particularly of m(n+1) if p=m, which indicates that the gain of this solution tends towards 2 for n as compared with the prior solution.

The decoding device described above is to be arranged in such a way that the memory 43 is always empty when the memory 44 is filled up. To this end, the two memories should be able to store at least twice the data received. It will thus be possible to write only one data every two cycles. The free cycle will be available for the memory 44 to reread the memory 43.

The most unfavorable case may be considered as an example. 31 Values are stored in the audio section and 32 values are stored in the video section of the memory 44. As the video section is full, a request for storage is made to the arbitration circuit for storing the data in memory 46. The maximum response time is 200 clock cycles and storage itself requires 6+32*2 cycles=70 cycles, i.e. a total of 270 cycles. The data present in the memory 43 is an audio data so that the audio block 45b in the memory 44 will be full. As from the first access to the memory 43, a new request for transfer to the memory 46 is made to the arbitration circuit and the 270 cycles are used again. The memory 43 will be filled up when the memory 44 is linked up with the memory 46. The theoretical maximum rate at which the data can be received is 64*4=256 octets (size of the memory 43) in 540 cycles (maximum occupation time of the memory 44). Consequently, the present embodiment cannot support a maximum rate which is higher than 1 octet every 2.1 cycles. The clock has a frequency of 40.5 MHz and the theoretical maximum rate is 19.3 MO/sec if more than 256 octets are consecutively applied. The real average rate is thus equal to 2 MO/sec maximum, which leaves a sufficiently large range for the rate to be locally subjected to large variations.

The present invention is obviously not limited to the described embodiment, and other solutions may be proposed without departing from the scope of this invention. For instance, it has been stated that the decoding device may receive n distinct types of data. The input stage then comprises n storing registers, the size of which is that of each of one storing unit of the memory 46. The size of one storing unit of the memory 43 is equal to the size of one register plus the number of bits needed for coding the type of data (two-bit code TBC), according to the formula:

$$\text{code size (bits)} = int\ (\log_2\ (n) + 1 - 1/n)$$

The memory 44 comprises n blocks, the size of which is that of the registers, and this size of the registers is originally selected by the user (32 bits, 48 bits ...).

What is claimed is:

1. A device for decoding encoded digital signals corresponding to n distinct types of data, wherein said signals are multiplexed in conformity with the known MPEG-2 encoding standard; said device having an input interface which comprises:

a storage sub-assembly having n registers respectively corresponding to the n distinct types of data, said registers receiving in parallel a stream of input data corresponding to the multiplexed encoded digital signals;

a common bus coupled to said storage sub-assembly for enabling data transfer to an external memory;

a first buffer memory coupled to said storage sub-assembly for temporarily storing the contents of a selected one of said n registers of said storage subassembly as soon as said selected register is full, and further temporarily storing information concerning the type of data stored in said first buffer memory;

a second buffer memory coupled to said first buffer memory comprising n memory blocks connected in parallel for storing, per type of data, the contents of said first buffer memory; and means for providing a synchronizing clock for carrying out requests for transfer of data from said second buffer memory to said external memory.

2. A decoding device as claimed in claim 1, wherein said storage sub-assembly comprises two registers respectively corresponding to video data and audio data, and said second buffer memory comprises two memory blocks arranged in parallel for storing the contents of the first buffer memory.

* * * * *